April 14, 1931.  J. C. TUMLIN  1,800,969
AUTOMOBILE BRAKE
Filed Dec. 8 1928
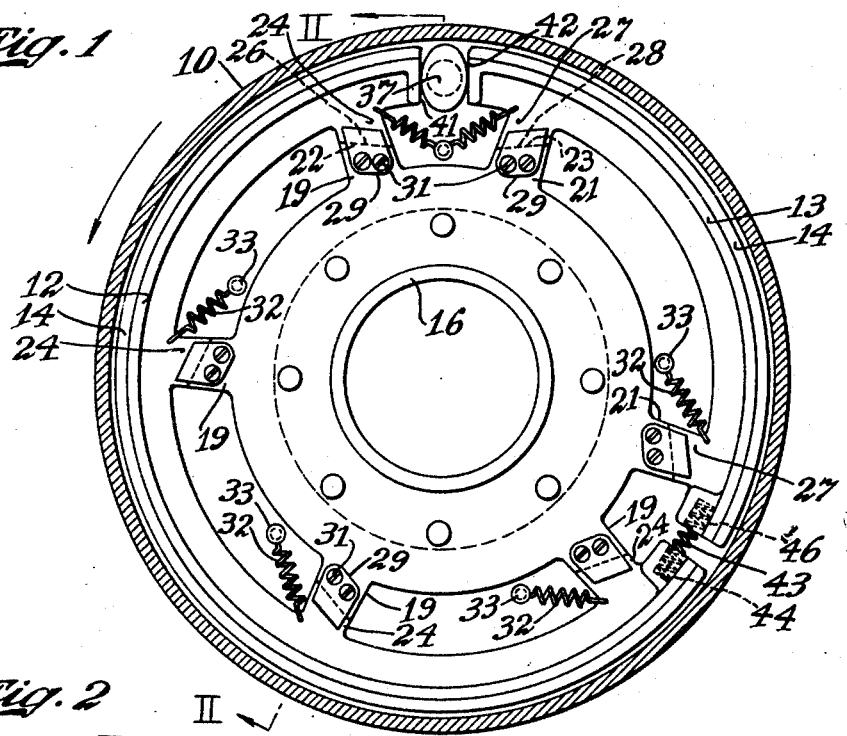
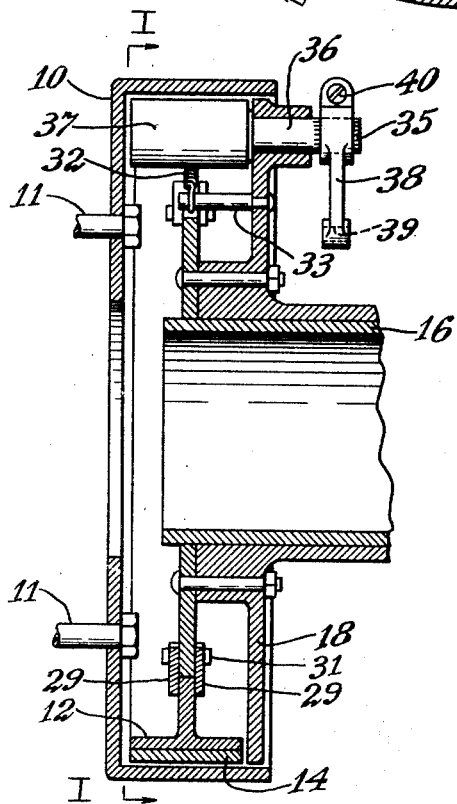
Inventor
James C. Tumlin
By Johnston & Jennings
Attorneys Patented Apr. 14, 1931

1,800,969

UNITED STATES PATENT OFFICE

JAMES C. TUMLIN, OF BIRMINGHAM, ALABAMA

AUTOMOBILE BRAKE

Application filed December 8, 1928. Serial No. 324,680.

My invention relates to brakes, more particularly to brakes of the rotary drum type such as are employed with automobiles, and has for its object the provision of apparatus of the character designated which shall be simple of construction and which shall be effective to provide uniform frictional engagement of the brake shoes with the drum throughout the length of the shoes.

A further object of my invention is to provide a brake of the rotary drum, internal shoe type wherein the shoes are brought into uniform frictional engagement with the drum and wherein simple effective means for adjusting the brake is provided.

A further object of my invention is to provide an automobile brake of the rotary drum, internal shoe type wherein means are provided for actuating the shoes which shall be effective to cause the shoes to exert a uniform pressure throughout their lengths against the brake drum.

A still further object of my invention is to provide an automobile brake of the rotary drum, internal brake shoe type wherein the brake shoes are supported on radial supports which are inclined outwardly in a plane parallel with the plane of rotation of the drum, together with means for actuating the shoes on the supports whereby they are forced outwardly and uniformly to engage the brake drum.

A still further object of my invention is to provide an automobile brake which embodies a readily controllable self-generative force in applying it, thereby greatly reducing the force required to operate it.

Briefly, my invention comprises a rotary brake drum which is secured to the automobile wheel and which is provided with internal brake shoes cooperating with the drum. The brake shoes are supported by radial supports carried from the axle housing, said supports being inclined outwardly in a direction parallel to the plane of rotation of the drum, and the brake shoes being provided with feet which are inclined in a direction parallel to their respective supports. In applying the brake, the shoes are actuated in a direction to move them outwardly on their supports whereby they are brought into uniform frictional engagement with the brake drum. The brakes are released by means of conventional springs.

Apparatus embodying features of my invention is illustrated in the accompanying drawings, forming a part of this application, wherein Fig. 1 is a vertical sectional view of a brake made in accordance with my invention;

Fig. 2 is a sectional view taken along the line II—II of Fig. 1; and

Fig. 3 is a view similar to Fig. 1 showing a modified form of my invention.

Referring to the drawings for a better understanding of my invention, I show a rotary brake drum 10 adapted to be secured to a wheel, not shown, by means of bolts 11. The vehicle with which the brake is associated is assumed to be going ahead when the drum 10 is rotating in the direction shown by the arrow.

Located within the drum 10 are brake shoes 12 and 13 which are provided with the usual lining 14. As shown in Fig. 1, the brake shoe 12 is made much longer than the brake shoe 13 for a purpose which will shortly appear.

At 16 is shown a conventional axle housing upon which is supported a disk 18 which is made a fairly close fit with the interior of the drum 10 so as to prevent water or dirt from getting to the interior of the drum. Carried by the disk 18 are a plurality of radial brake shoe supports 19 which cooperate with the brake shoe 12 and a lesser number of radial supports 21 which cooperate with the brake shoe 13. The brake shoe supports 19 are provided with supporting surfaces 22 which are inclined in a plane parallel with the plane of rotation of the drum and outwardly in the direction of ahead rotation of the drum, while the brake shoe supports 21 are provided with supporting surfaces 23 which are inclined outwardly in a reverse direction to that of the surface 22.

The brake shoe 12 is provided with feet 24 cooperating with the supports 19 and having surfaces 26 which engage with the surfaces 22 of the supports 19, and which are inclined in a direction parallel to the inclined surfaces 22. The brake shoe 13 is likewise provided with feet 27 having engaging surfaces 28 cooperating with the surfaces 23 of the supports 21 and which are inclined in a direction parallel to the surfaces 23. The brake shoes are held in place with respect to their supporting surfaces by means of guide members 29 secured to the respective supports by means of bolts 31.

The brake shoes 12 and 13 are both normally biased in an inward direction, or in a direction to pull them inwardly of the drum 10 by means of a plurality of springs 32 which are anchored to pins 33 secured to the disk 18. The springs 32 also serve to prevent excessive vibration and rattling of the parts.

Journaled in the upper part of the disk 18 is a rock shaft 36 carrying on its end inside the drum 10 a cam 37. Carried on the outer end of the shaft 36 is an arm 38 having provided at its lower end a hole 39 to which may be secured actuating means, not shown. The outer end of the shaft 36 is provided with longitudinal grooves as shown at 35 around which the upper end of the arm 38 is adjustably clamped by means of a bolt 40. The cam 37 bears against the inturned upper ends 41 and 42 of the brake shoes 12 and 13 respectively. The opposite ends of the brake shoes are normally biased apart by means of a spring 43 seated in recesses 44 and 46 respectively in the brake shoes 12 and 13.

In the operation of my improved brake, the cam 37 is partially rotated by means of the arm 38 to spread the upper ends of the brake shoes 12 and 13 apart. As the brake shoes spread apart, the feet 24 move outwardly on the inclined planes formed by the supporting surfaces 22 of the supports 19 and the brake shoe 12 is brought into uniform frictional engagement with the drum 10. Likewise, the brake shoe 13 is moved outwardly along the inclined planes defined by the supporting surfaces 23 of the supports 21. In designing the brake the angles of inclination and the distances of the same throughout their lengths from the center of the axle housing are made equal so that the brake shoes move out uniformly when being applied and engage the brake drum 10 with an equal force throughout. Upon turning the cam 37 in the opposite direction, the springs 32 pull the brake shoes back down the inclined planes, or inwardly of the brake drum to release the brakes.

As has already been pointed out, the surfaces 22 diverge outwardly from the center of the housing when considered in the general direction of ahead rotation of the drum 10, while the surfaces 28 of the supports 21 incline inwardly when considered in the direction of ahead rotation and outwardly in the direction of reverse rotation of the drum 10, or reverse to the direction of inclination of the surfaces 22. The purpose of so directing the inclinations of the supporting arm is to provide a brake which is self-generative of force. When the brake is being applied, while the drum 10 is rotating in the direction shown by the arrow, the brake shoe 12 frictionally engages the drum and the drum 10 then aids the cam 27 in pulling the brake shoe around with the drum and outwardly on the supporting surfaces 22. Likewise, when the brake is being applied with the drum 10 rotating in a reverse direction, the feet 27 move outwardly on the inclined surfaces 28 and, when the brake shoe 13 is engaged with the drum, the brake shoe is pulled around with the drum to cause it to engage tightly with the drum. I provide more surfaces 22 inclined to aid the brake in setting when going ahead than I provide when going in a reverse direction, for the reason that the brake is employed far oftener and at higher speeds when going ahead than when in reverse.

In designing the brake, the angle of inclination of the brake shoe supports determines the degree of force self-generated when applying the brake. It will accordingly be apparent that the self-generative force of the brake is readily controllable by altering the angle of inclination.

To adjust the brake, the arm 38 is set on the shaft 36 in the desired operating position with the cam 37 forcing the brake shoes sufficiently apart for them to be just out of frictional engagement with the drum 10.

The apparatus shown in Fig. 3 is similar to that shown in Fig. 1, except that instead of providing one long brake shoe 12 and one short brake shoe 13, I provide three brake shoes 51, 52 and 53. The three brake shoes are supported in the same manner as already described for the brake shoes 12 and 13 of Fig. 1. In this modification, however, the brake shoes 51 and 52 are pivotally connected together at 56 while the connected brake shoes 51 and 52 are normally biased away from the shoe 53 by a spring 58 which is similar to the spring 43. The construction shown in this figure of the drawing may be advantageously employed with brake drums which are slightly out of round, the greater number of shoes used and their pivotal connection providing a greater flexibility than is possible to obtain with the one long brake shoe 12 shown in Fig. 1. Otherwise the operation and construction of the two modifications are the same.

From the foregoing, it will be apparent that I have devised an improved automobile brake which is simple of construction and adjustment, easy of manufacture, and by means of which a uniform braking pressure may be obtained around the entire periphery of the brake drum.

While I have shown my invention in but two forms, it will be obvious to those skilled in the art that it is not so limited but is susceptible of various other changes and modifications, without departing from the spirit thereof, and I desire therefore that only such limitations shall be placed thereupon as are imposed by the prior art, or as are specifically set forth in the appended claims.

What I claim is:

1. In a brake of the character described, a brake drum, an axle housing, a plurality of radially extending brake shoe supports supported from the axle housing and having their outer ends inclined in a plane parallel to the plane of rotation of the drum, some of said supports being inclined outwardly in the direction of the ahead rotation of the drum and the others inclined in a reverse direction, brake shoes carried by the supports in a position to cooperate with the drum, the area of the brake shoe cooperating with the supports inclined in the direction of ahead rotation comprising the major brake shoe areas, and means for actuating the brake shoes on the supports to bring them into frictional engagement with the brake drum.

2. In a brake of the character described, a brake drum, an axle housing, a plurality of radially extending brake shoe supports supported from the axle housing and having their outer ends inclined in a plane parallel to the plane of rotation of the drum, the greater number of said supports being inclined outwardly in the direction of the ahead rotation of the drum and the lesser number inclined in a reverse direction, a pair of brake shoes of different lengths carried by the supports in a position to cooperate with the drum, the shoe of greater length cooperating with the supports inclined in the direction of ahead rotation, and means for actuating the brake shoes on the supports to bring them into frictional engagement with the brake drum.

3. In a brake of the character described, a brake drum, an axle housing, a plurality of radially extending brake shoe supports supported from the axle housing and having their outer ends inclined in a plane parallel to the plane of rotation of the drum, the greater number of said supports being inclined outwardly in the direction of the ahead rotation of the drum and the lesser number inclined in a reverse direction, brake shoes carried by the supports in a position to cooperate with the drum, the greater brake shoe area cooperating with the supports inclined in the direction of ahead rotation, means for actuating the brake shoes on the supports to bring them into frictional engagement with the brake drum, and resilient means to actuate the brake shoes in the opposite direction to bring them out of frictional engagement.

4. In a brake of the character described, a brake drum, an axle housing, a plurality of radially extending brake shoe supports supported from the axle housing and having their outer ends inclined in a plane parallel to the plane of rotation of the drum, the greater number of said supports being inclined outwardly in the direction of the ahead rotation of the drum and the lesser number inclined in a reverse direction, brake shoes located within the drum in a position to frictionally engage therewith, the greater brake shoe area cooperating with the supports inclined in the direction of ahead rotation, feet carried by the brake shoes and resting on the supports, said feet being inclined in a direction parallel to their cooperating supports, and means to actuate the brake shoes on the supports to bring them into frictional engagement with the brake drum.

5. In a brake of the character described, a brake drum, an axle housing, a plurality of radially extending brake shoe supports supported from the axle housing and having their outer ends inclined in a plane parallel to the plane of rotation of the drum, the greater number of said supports being inclined outwardly in the direction of the ahead rotation of the drum and the lesser number inclined in a reverse direction, brake shoes located within the drum in a position to frictionally engage therewith, a greater length of brake shoe cooperating with the supports inclined in the direction of ahead rotation, feet carried by the brake shoes and resting on the supports, said feet being inclined in a direction parallel to their cooperating supports, means to actuate the brake shoes on the supports to bring them into frictional engagement with the brake drum, and springs to actuate the brake shoes in the opposite direction.

In testimony whereof I affix my signature.

JAMES C. TUMLIN.